INVENTOR
*D. C. GLOGE*
BY
*Lyman Sherman*
ATTORNEY

United States Patent Office 3,675,985
Patented July 11, 1972

3,675,985
OPTICAL AUTOCORRELATOR FOR AUTOCORRELATING PICOSECOND OPTICAL PULSES
Detlef Christoph Gloge, Red Bank, N.J., assignor to Bell Telephone Laboratories, Incorporated, Murray Hill and Berkeley Heights, N.J.
Filed Aug. 3, 1970, Ser. No. 60,476
Int. Cl. G02b 27/28; G02f 1/26
U.S. Cl. 350—157                                                  10 Claims

ABSTRACT OF THE DISCLOSURE

An optical autocorrelator which can be employed to investigate optical pulses having durations of the order of $10^{-12}$ seconds is disclosed. The autocorrelator comprises a single birefringent, nonlinear medium. Optical pulses are applied to the medium such that each pulse is resolved into two orthogonally polarized component pulses traveling with different group velocities. By causing multiple reflections of the pulses between a first and second surface of the medium, the pulses are made to trace out a zigzag path within the medium. In each traversal from the first surface to the second surface, the pulses generate second harmonic power whose time average is substantially proportional to a point on the intensity autocorrelation function of the pulses. Second harmonic detectors, located at the reflection points on the second surface, detect the second harmonic power generated, and various points on the autocorrelation function are thereby obtained. The latter function contains essentially all the information about the pulses, e.g., their width and their repetition rate.

BACKGROUND OF THE INVENTION

This invention relates to the investigation of optical signals and more particularly to an optical autocorrelator which can be used to measure optical pulses having durations of the order of $10^{-12}$ seconds.

As is well known, the output optical energy derived from a mode-locked laser consists of a train of ultrashort optical pulses. Typically, the duration of such pulses is of the order of $10^{-12}$ seconds. Since conventional measuring methods and apparatus cannot be employed to investigate pulses of such short duration, optical correlators, in which the pulses are intensity correlated with themselves, have been used. All such prior art devices generate the intensity autocorrelation function of the pulses, from which information concerning pulse width, repetition rate, etc. can be obtained using standard analysis techniques.

In general, the aforesaid prior art devices have consisted of arrangements in which the original beam of pulses is divided into two superposed, parallel beams of orthogonally polarized pulses having an adjustable delay between them. The superposed beams are then applied along a predefined direction to a nonlinear optical medium wherein phase-matched second harmonic power is generated. The time average of the generated power is proportional to a point on the autocorrelation function of the pulses of the original beam. By suitably adjusting the delay between the pulses of the two beams, a replica of the entire autocorrelation characteristic is realized.

It should be noted, however, that in such prior art devices, generation of the superposed parallel beams requires that the original beam be divided into two beams, and that the two beams be recombined after one beam has been rotated 90° in polarization and the other beam has been caused to traverse a variable path length. Thus, the necessity of dividing and recombining the optical beam causes these devices to be optically complex. Moreover, the variable optical path is usually effected by displacing an optical component. Since the distances the component must be moved are quite small, difficulty in obtaining the required precision is often encountered with the result that accurate measurements are not always obtained. Also, it should be further noted that the aforesaid prior art devices are incapable of resolving changes in signal structure which are faster than the rate at which the optical component can be displaced. Thus, only an average pulse width can be derived from the generated autocorrelation function.

It is therefore a broad object of the present invention to provide an optical autocorrelator for investigating ultrashort optical pulses which does not involve displacement of optical components nor the employment of a complex optical system, and which provides better resolution capabilities than heretofore available.

SUMMARY OF THE INVENTION

In accordance with the principles of the present invention, autocorrelation of ultrashort optical pulses is achieved by utilizing a single birefringent, nonlinear optical medium. More particularly, the wave of pulses to be correlated is applied to the medium such that, when propagating within the medium, it can be resolved into two substantially superposed component waves of pulses having orthogonal polarizations and different group velocities. Moreover, application of the original wave is such that the two orthogonally-polarized component waves propagate in the medium along a preselected direction for which second harmonic power is generated only when the two component waves overlap.

Since the pulses of each component wave propagate with different group velocities, a variable differential time delay arises between corresponding pulses of the waves as they traverse the medium. As a result, it is found that the second harmonic power generated by the pulses, in propagating over a short path in the medium, along the preselected direction, is proportional to an average, over a narrow correlation interval, of the intensity autocorelation function of the pulses. The aforesaid correlation interval is determined by the total differential delay which the pulses experience on the path. Accordingly, by causing multiple reflections of the orthogonally polarized pulses between two parallel surfaces of the medium, the pulses are caused to make multiple transits through the medium along parallel paths which are spaced from each other and parallel to the preselected direction and, as a result, to generate average values of the autocorrelation function over successive correlation intervals. By appropriately spacing the reflecting surfaces, average values which closely approximate true values on the autocorrelation function are realized. Moreover, by providing a sufficient number of reflections, an entire replica of the autocorrelation function is obtained.

DESCRIPTION OF THE DRAWINGS

The above and other features and aspects of the invention will become more apparent upon consideration of the following detailed description taken in conjunction with the accompanying drawings, in which.

DETAILED DESCRIPTION

Figure 1:
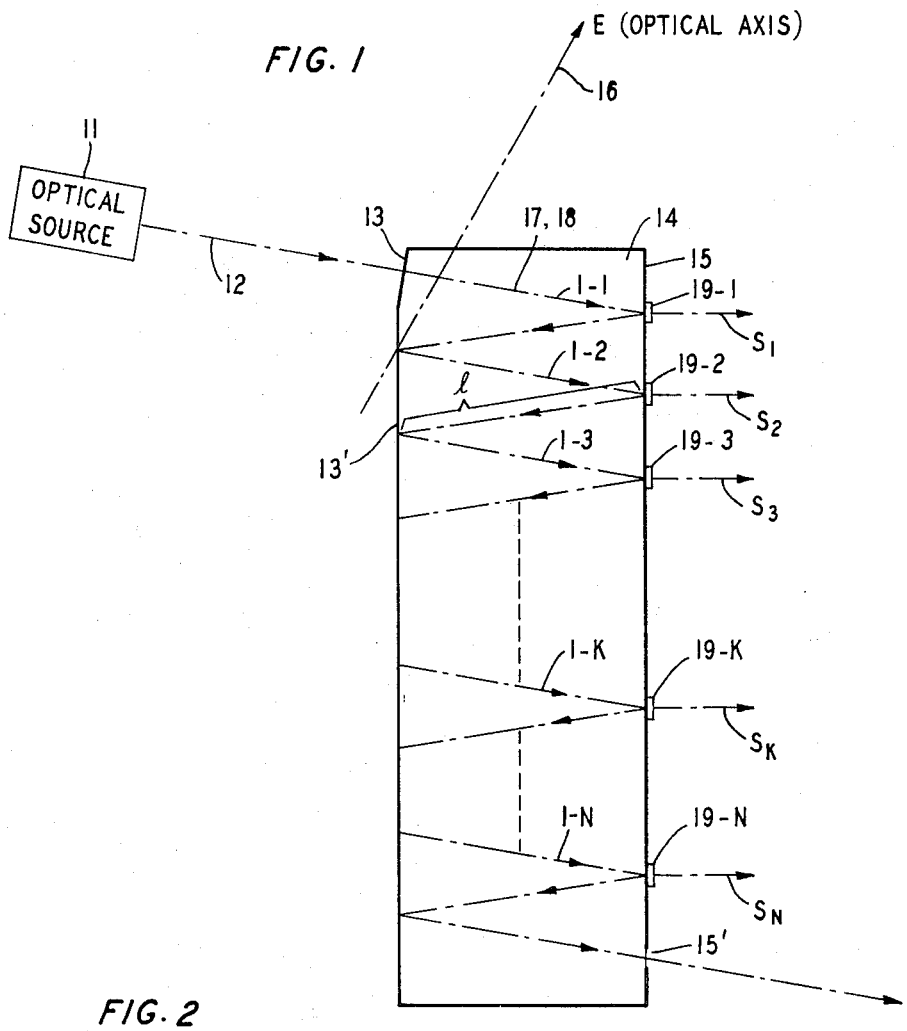
FIG. 1 is illustrative of an arrangement for autocorrelating ultrashort optical pulses in accordance with the principles of the instant invention.

FIG. 1 shows an optical autocorrelator in accordance with the principles of the present invention. As illustrated, an optical wave 12 having a frequency ω, derived from an optical source 11, is applied normal to a surface 13 of an optically birefringent, nonlinear medium 14, such as KDP. Optical source 11 is assumed to be a mode-locked laser such as, for example, a mode-locked Nd laser. Thus, wave 12 typically comprises a train of optical pulses, each having a duration of the order of $10^{-12}$ seconds.

Surface 13' of medium 14 is coated to be highly reflective to incident optical wave energy of frequency ω, but transparent to wave energy at the second harmonic of the latter frequency (see E. R. Costich, "Coatings for One, Two, and Even Three Wavelengths," Laser Focus, vol. 15, pp. 41–45, November 1969). Surface 15 is similarly coated except for an exit window 15'.

For purposes of simplifying the discussion, it is assumed that medium 14 is uniaxial. Thus, its birefringent properties can be characterized by reference to two mutually perpendicular axes. One axis is the optical axis E. The other axis, the so-called ordinary axis O, is mutually perpendicular to the optical axis and to the direction of impinging light wave 12.

In the instant illustrative embodiment, the plane of FIG. 1 has been selected such that it corresponds to the plane defined by the E-axis, represented by vector 16, and the direction of propagation of wave 12. Thus, the O-axis is normal to the plane of the figure.

Optical waves which are incident normal to the surface of medium 14 and oblique to the O–E plane can be resolved into two collinear component waves within the medium. One component wave, while polarized in the plane of the figure, has its polarization inclined to the optical axis. This wave sees an index of refraction $n_e$ which is a funtcion of the angle between its polarization and the E-axis. The other wave is polarized parallel to the O-axis and sees the ordinary index of refraction $n_o$ as it propagates.

In the present example, the optical pulses of wave 12 are polarized at 45° with respect to the O-axis. Thus, when propagating within medium 14, each pulse can be resolved into two equal, orthogonally-polarized component pulses.

Figure 2:
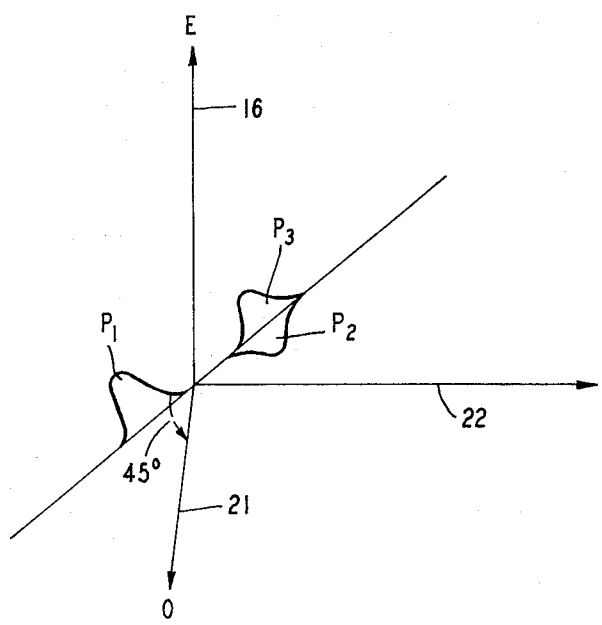
FIG. 2 shows the resolution of a single optical pulse into two orthogonally polarized component pulses upon incidence at the surface of the optical medium of FIG. 1.

In FIG. 2, a typical pulse $p_1$ of wave 12 is shown incident upon medium 14. As illustrated, $p_1$ is polarized at 45° with respect to the O-axis, represented by vector 21, and is propagating in the plane defined by vectors 16 and 22, which plane corresponds to the plane of FIG. 1.

Within medium 14, pulse $p_1$ can be resolved into two equal, orthogonally-polarized component pulses $p_2$ and $p_3$. Pulse $p_2$ is polarized parallel to the O-axis and, thus, sees $n_o$ as it propagates. Pulse $p_3$, on the other hand, is polarized in the plane defined by vectors 16 and 22. Hence, it sees $n_e$ as it propagates.

It should be noted that pulses $p_2$ and $p_3$ propagate with different group velocities within medium 14. As a result, the slower propagating pulse $p_2$ is delayed in time with respect to the faster propagating pulse $p_3$. The differential time delay $t_d$ per unit length of travel of the pulses can be expressed in terms of the refractive indices $n_o$ and $n_e$ and their dispersion in medium 14. Thus, $$t_d = \frac{1}{c}\left[(n_o - n_e) - \lambda\left(\frac{dn_o}{d\lambda} - \frac{dn_e}{d\lambda}\right)\right]$$

where λ is the wavelength of wave 12, c is the speed of light in a vacuum, $dn_o/d\lambda$ is the change in $n_o$ with respect to λ, and $dn_e/d\lambda$ is the change in $n_e$ with respect to λ.

In a similar manner, each of the pulses of wave 12 can be resolved into two component pulses as was pulse $p_1$. Thus, within medium 14, wave 12 can be represented as two waves 17 and 18 of equal, orthogonally-polarized component pulses. Each pulse component of wave 17 is polarized perpendicular to the plane of FIG. 1, while its corresponding pulse component in wave 18 is polarized in the plane of FIG. 1. Moreover, the corresponding pulses of the waves experience a differential time delay $t_d$ per unit length of travel in the medium.

As shown in FIG. 1, waves 17 and 18 propagate through medium 14 and are redirected by surface 15, which as previously mentioned is coated so as to be highly reflective at the optical frequency ω of the waves, except for exit window 15'. The waves are then redirected by surface 13', which is similarly coated. Subsequent reflections from surfaces 15 and 13' cause the two waves to trace out a zigzag path in the medium. After the (2N)th reflection, where N is the number of transits from surface 13' to 15 (i.e., the number of forward transist), the waves leave the medium through exit window 15'.

In addition to being birefringent, medium 14 is also nonlinear such that second harmonic wave energy is generated by the interaction of waves 17 and 18. (see, J. A. Armstrong, N. Bloombergen, J. Duching, and P. S. Pershan, "Interactions Between Light Waves in a Nonlinear Dielectric," Physical Review, vol. 129, pp. 1918–1939, September 1967; and A. Yarin, Quantum Electronics, chap. 20, John Wiley and Sons.) Moreover, the initial direction of propagation of both waves is selected such that they, and the second harmonic wave are phase-matched, i.e., the vector sum of the wave vectors of the waves is substantially zero. Under these conditions, second harmonic light is generated constructively only where waves 17 and 18 are coexistent, i.e., where the orthogonally-polarized pulses of the waves overlap. (See H. P. Weber, "Method for Pulse Width Measurement of Ultrashort Light Pulses Generated by Phase-Locked Lasers Using Nonlinear Optics," Journal of Applied Physics, vol. 38, pp. 2231–2234, April 1967.) It should be noted, however, that such generation occurs only during forward transits, since for reverse transits, the propagation direction of the waves is no longer parallel to their initial propagation direction and, thus, phase-matching is not realized.

The second harmoic light generated during each forward transit propagates substantially collinearly with waves 17 and 18. Thus, the second harmoic light impinges upon surface 15 at the same points as generating waves 17 and 18. However, while waves 17 and 18 are reflected from the latter surface, the second harmonic light is transmitted therethrough and detected.

As shown in FIG. 1, second harmoic light detectors 18–1 to 19–N, which typically can be photodiodes, are affixed to surface 15 at the points of reflection of waves 17 and 18. Each detector collects the second harmonic light transmitted through the surface at its respective locaion and develops an output signal which is proportional to the average power of the collected light. Output signals $S_1$ to $S_n$, therefore, are proportional to the average second harmonic power developed in forward transists 1–1 to 1–N, respectively.

It can be shown that the average power in the second harmonic light developed in each of the forward transists of waves 17 and 18 is proportional to the average value of the intensity autocorrelation function $g(\tau)$ of the pulses of the waves over a correlation interval beginning at a correlation time equal to the differential time delay between corresponding pulses at the start of the transit and ending at a correlation time equal to the differential time delay between corresponding pulses at the termination of the transit. Since the path length of each forward transit is the same, the width of the correlation inerval corresponding to each transit is equal to $\tau_d l$, where $l$ is the path length of a single transit. Moreover, since no second harmonic is generated during reverse transits and the path length of each reverse transit is similarly equal to $l$, the correlation intervals corresponding to successive transits are separated by an amount $\tau_d l$. Output signal $S_1$, therefore, is proportional to the average value of $g(\tau)$ over the interval $(\tau_d l—o)$, signal $S_2$ over the interval $(3\tau_d l—2\tau_d l)$, signal $S_3$ over the interval $(5\tau_d l—4\tau_d l)$, etc. Thus, a plot of the output signals of the detectors, as a function of the mid-points of the correlation inervals, depicts an approximation to the actual function $g(\tau)$.

Figure 3A:
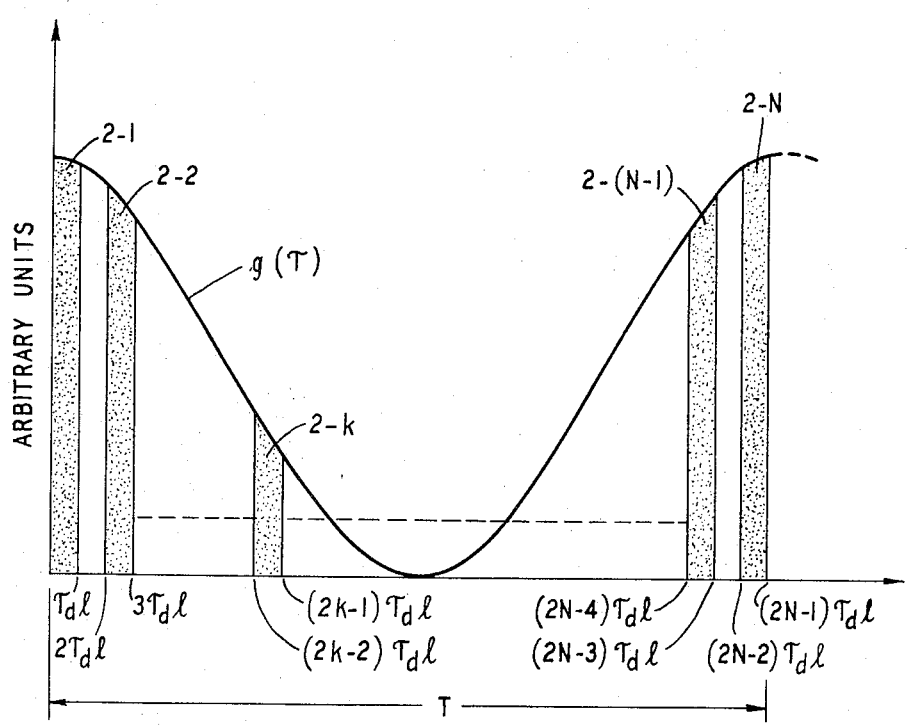
FIG. 3A, included for purpose of explanation, illustrates a typical intensity autocorrelation function.

In FIG. 3A, a typical intensity autocorrelation function is illustrated. It is assumed that this function is periodic, wih a period T substantially equal to the period of the pulses. Hence only one period is shown. As illustrated, the function is divided into N equally spaced, equally separated intervals corresponding to the N correlation intervals associated with the N forward transits of waves 17 and 18. Thus, the average values of $g(\tau)$ over intervals 2–1 to 2–N correspond to the signals $S_1$ to $S_n$, respectively.

Figure 3B:
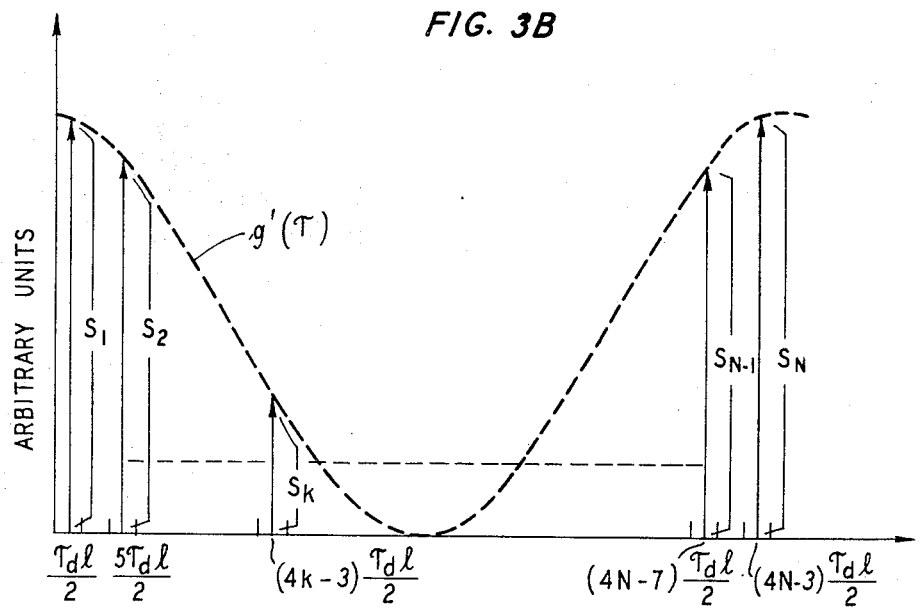
FIG. 3B, also included for purpose of explanation, is illustrative of an approximation to the intensity autocorrelation function of FIG. 3A generated by use of the present invention.

In FIG. 3B, the amplitudes of the signals $S_1$ to $S_n$ are plotted as a function of the mid-points of the N intervals of FIG. 3A. Thus, the envelope of the amplitudes, shown by dotted curve $g'(\tau)$, is the approximation to $g(\tau)$ afforded by the output signals developed by the detectors. As can be noted, the generated curve $g'(\tau)$ is a substantially close approximation to $g(\tau)$.

It should be pointed out that the generated intensity autocorrelation function $g'(\tau)$ can be used to determine the pulse width, repetition rate and other information about the pulses of the waves. For a discussion of the standard analysis techniques employed to make such determinations, see, for example, A. J. DeMaria, W. H. Glenn, Jr., M. J. Brienza, and M. E. Mack, "Picosecond Laser Pulses," Proceedings of I.E.E.E., vol. 57, pp. 2–25, January 1969.

It is also important to note that the accuracy of the generated autocorrelation function is dependent upon the width $\tau_d l$ of each correlation interval and the number N of forward transits. In general, the value of N must be such as to insure that the correlation range, i.e., the interval measured from the beginning of the first correlation interval to the end of the Nth correlation interval, covers the period T. This condition is substantially met by selecting N in accordance with the relationship T equals $(2N—1)$ $\tau_d l$. With respect to the parameter $\tau_d l$, it has been experimentally determined that a value of $\tau_d l$ of the order of the $3 \times 10^{-13}$ can be employed to generate a $g'(\tau)$ with is sufficiently accurate to measure pulse widths of the order of $10^{-12}$ seconds.

One further point to note, with respect to $\tau_d l$, is that the length $l$ should be such as to ensure generation of second harmonic power at detectable power levels. Thus, in general, the minimum $l$ for any application will depend, among other things, upon the power sensitivity of the particular detectors employed in array 19. As an example, experimental determinations have indicated that when employing KDP as medium 14, and $l=3$ mm. permits the analysis of milliwatt signals.

The manner in which the output signals of detector 19 are monitored will depend upon the particular application. If information is required as to how the pulses of the waves are changing, such information can be determined from observing how the autocorrelation function is changing. Thus, for applications of this type, the output signals can be monitored by high-speed sampling scopes which are capable of detecting changes in the signals. Typically, sampling scopes having response times of the order of $10^9$ second can be employed and, hence, changes in the autocorrelation function and, therefore, the pulses occurring at a rate of the order of the reciprocal of the latter response time can be recorded.

If the only information required is an average value of the pulse width, repetition rate, etc., the output signals can be slowly sampled in sequence and viewed on an oscilliscope.

In connection with the discussion of the embodiment of FIG. 1, it was pointed out that each of the correlation intervals was of equal width and, moreover, that successive intervals were spaced apart an amount equal to the interval width. It may be desirable, in some instances, such as, for example, when the intensity autocorrelation function is broad, to have a spacing between intervals which is greater than the interval width. In such cases, the embodiment of FIG. 4, in which the spacing between correlation intervals can be set independently of the interval width, can be employed.

Figure 4:
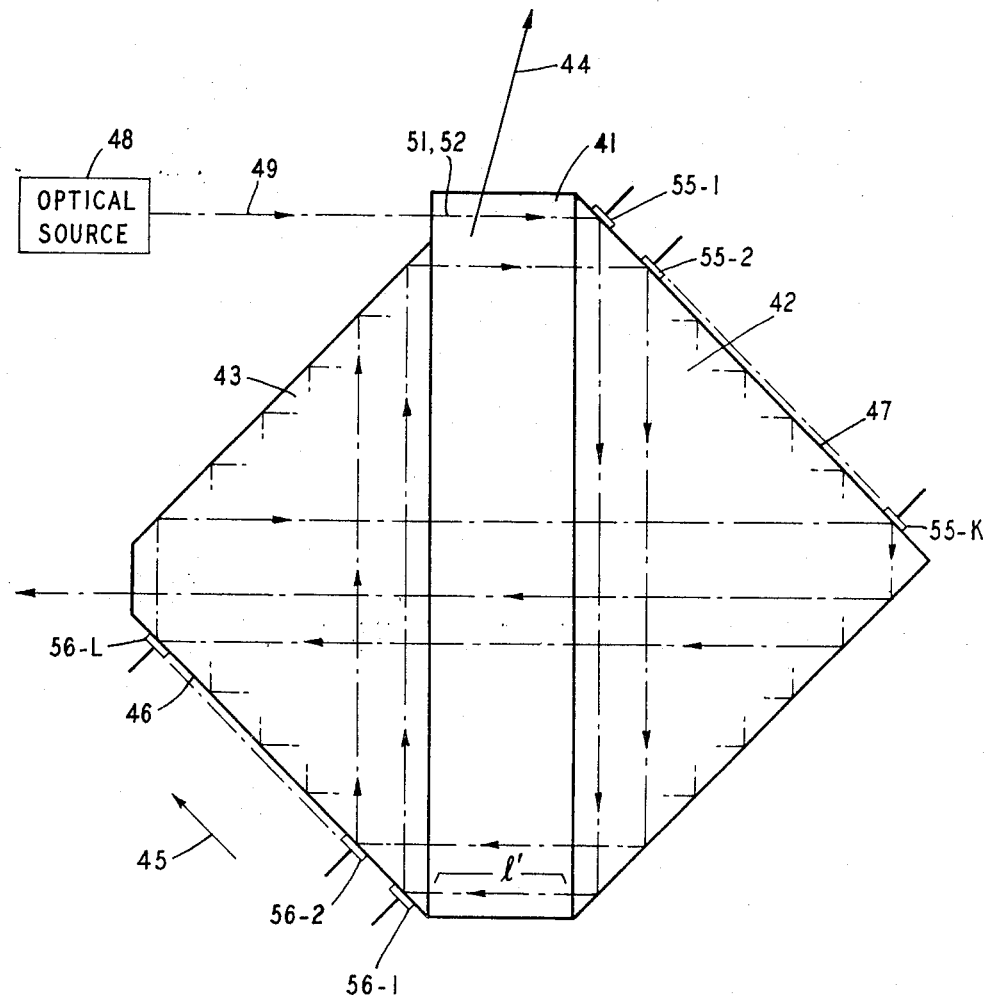
FIG. 4 is a second arrangement for autocorrelating ultrashort optical pulses in accordance with the principles of the instant invention.

In FIG. 4, a birefringent, nonlinear medium 41, similar to medium 14, is sandwiched between two 45 degree birefringence prisms 42 and 43 which, typically, can be made of calcite. Both medium 41 and prisms 42 and 43 are selected to be uniaxial. The optical axis of medium 41 is in the plane of the figure and lies along a direction defined by vector 44. The optical axes of prisms 42 and 43 are also in the plane of the figure, but in the direction defined by vector 45, which direction is parallel to surfaces 46 and 47.

A wave of ultra-short optical pulses 49, developed by optical source 48, is applied normal to the surface of medium 41. The polarization of wave 49 is selected such that, within medium 41, wave 49 can be resolved into two component waves 51 and 52 of orthogonally polarized pulses. In the instant case, wave 49 is polarized at 45° with respect to the plane of the figure. Moreover, the initial direction of propagation of wave 49 is chosen such that the orthogonally polarized pulses of the waves cooperate to generate second harmonic light in both forward and reverse transits through medium 41.

After each transit through medium 41, waves 51 and 52 and the generated second harmonic light are transmitted through the surface of the medium and are incident upon surface 47 of prism 42 or surface 46 of prism 43, depending upon the particular transit. At either surface, the incident second harmonic light is transmitted therethrough and detected, while the waves are redirected to the second surface of the respective prism, where they are again redirected through medium 41.

As in the previous embodiment, detectors 56–1 to 56–L and detectors 55–1 to 55–K develop output signals which are proportional to the average second harmonic power generated during the transits to which they correspond. Moreover, since the path length of each transit through medium 41 is the same, the average second harmonic power developed during each transit is proportional to the average value of the intensity autocorrelation function of the pulses over correlation interval of the same width. Hence, each of the detector output signals corresponds to an average value of the autocorrelation function over a correlation interval $\tau_d'l'$, where $\tau_d'$ is the delay per unit length experienced by the corresponding pulses of the waves in medium 41 and $l'$ is the length of a single transit.

As can be observed, however, prior to the beginning of each transit through medium 41, waves 51 and 52 traverse over a path in prism 42 or 43. Due to the birefringence of the prisms and the orientations of their optical axes, passage through each prism causes the corresponding orthogonally polarized pulses of the waves to be delayed an amount $\tau_d''l''$, where $\tau_d''$ is delay per unit length experienced by the corresponding pulses when traveling through each prism, and $l''$ is the length of travel in each prism. Thus, the correlation interval corresponding to each transit is spaced an amount $\tau_d''l''$ from the interval corresponding to the prior transit and hence, the spacing between correlation intervals can be controlled independently of the interval width. In particular, by making $\tau_d''l'' > \tau_d'l'$, a spacing between intervals which is greater than the interval width can be realized.

It is to be understood that the embodiments described herein are merely illustrative, and that numerous and varied other arrangements can readily be devised in accordance with the teachings of the present invention by those skilled in the art without departing from the spirit and scope of the invention. In particular, the invention is not limited to use with a periodic train of pulses. Thus, for example, the invention can be employed to obtain the intensity autocorrelation function of non-periodic optical signals, random signals, or signals modulated in any other way. Moreover, in situations where only average values of repetition rate pulse width, etc., are required, a strip of photographic film can be used, as an alternative to the detector array, for recording the generated second harmonic power.

What is claimed is:

1. An optical autocorrelator comprising:
   a nonlinear, birefringent optical medium having at least two surfaces which are reflective to optical wave energy of frequency ω and transparent to optical wave energy at the second harmonic of said frequency;
   means for introducing into said medium an optical signal at said frequency and at a polarization for which said signal can be resolved into two component signals propagating with different group velocities within said medium, said signal being introduced such that said component signals are reflected by said surfaces and caused to make a plurality of transits through said medium, said transits originating from one of said surfaces being spaced from each other and parallel to a direction for which said component signals generate optical energy at the second harmonic of said frequency when said signals overlap;
   and means for detecting the second harmonic power generated by the component signals during each of said spaced transits.

2. An optical autocorrelator, in accordance with claim 1, in which said optical signal is a train of optical pulses, each of whose duration is of the order of $10^{-12}$ seconds.

3. An optical autocorrelator in accordance with claim 1:
   in which said medium has opposing first and second surfaces which are reflective to optical wave energy of frequency ω and transparent to optical wave energy at the second harmonic of said frequency; and
   in which said spaced transits made by said component signals originate from said first surface.

4. An optical autocorrelator, in accordance with claim 3, in which said first and second surfaces are parallel.

5. An optical autocorrelator, in accordance with claim 4, in which said means for detecting said second harmonic power comprises an array of detectors, each detector being disposed upon said second surface at a point of reflection of said component signals.

6. An optical autocorrelator in accordance with claim 3 in which said signal is introduced such that said component signals make an initial transit through said medium in said direction prior to reflection by said first and second surfaces.

7. An optical autocorrelator in accordance with claim 6 which includes, in addition, means for detecting the second harmonic power generated by said component signals during said initial transit.

8. An optical autocorrelator comprising:
   first and second birefringent optical prisms, each having one surface which is transparent to optical wave energy of frequency ω and two surfaces which are reflective to wave energy of said frequency and transparent to wave energy at the second harmonic of said frequency;
   a birefringent, nonlinear optical medium sandwiched between said first and second prisms along said surfaces which are transparent to optical wave energy of said frequency;
   means for introducing into said medium an optical signal at said frequency and at a polarization for which said signal can be resolved into two component signals propagating with different group velocities within said medium, said signal being introduced such that said component signals propagate through said medium and are reflected by said reflective surfaces and caused to make a plurality of transits through said medium and through said prisms, said transits through said medium being parallel and in a direction for which said component signals generate optical energy at the seond harmonic of said frequency when said signals overlap;
   and means for detecting the second harmonic power generated by said component signals during each of said parallel transits.

9. An optical autocorrelator in accordance with claim 8 in which said reflective surfaces of each of said prisms intersect at 45° and in which the optic axes of said prisms are each parallel to one of said reflective surfaces of said prisms.

10. An optical autocorrelator in accordance with claim 8 in which the means for detecting the second harmonic power generated during each of said parallel transits comprises a plurality of detectors, each detector being disposed on one of said reflective surfaces at a point of termination of one of said parallel transits.

References Cited

UNITED STATES PATENTS

| 3,384,433 | 5/1968 | Bloembergen | 350—150 |
| 3,422,273 | 1/1969 | Biernson | 350—157 UX |
| 3,297,875 | 1/1967 | Garwin et al. | 350—96 WG X |

OTHER REFERENCES

Weber "Method for Pulsewidth Measurement of Ultrashort Light Pulses Generated by Phase-Locked Lasers using Nonlinear Optics" Journal of Applied Physics, vol. 38, No. 5, April 1967, pp. 2231-2234.

JOHN K. CORBIN, Primary Examiner

U.S. Cl. X.R.

350—172